US 12,034,575 B2

(12) United States Patent
Faig et al.

(10) Patent No.: US 12,034,575 B2
(45) Date of Patent: Jul. 9, 2024

(54) CLOCK AND DATA RECOVERY CIRCUIT AND FEED FORWARD EQUALIZER DECOUPLING

(71) Applicant: Mellanox Technologies, Ltd., Yokneam (IL)

(72) Inventors: Hananel Faig, Jerusalem (IL); Yair Yakoby, Kfar Shmuel (IL); Oz Harel, Ness Ziona (IL)

(73) Assignee: Mellanox Technologies, Ltd., Yokneam (IL)

( * ) Notice: Subject to any disclaimer, the term of this patent is extended or adjusted under 35 U.S.C. 154(b) by 7 days.

(21) Appl. No.: 18/079,304

(22) Filed: Dec. 12, 2022

(65) Prior Publication Data
US 2024/0195663 A1    Jun. 13, 2024

(51) Int. Cl.
  *H04L 25/03* (2006.01)
(52) U.S. Cl.
  CPC .. *H04L 25/03885* (2013.01); *H04L 25/03273* (2013.01); *H04L 25/03853* (2013.01)
(58) Field of Classification Search
  CPC ......... H04L 25/03885; H04L 25/03273; H04L 25/03853
  See application file for complete search history.

(56) References Cited

U.S. PATENT DOCUMENTS

| 9,077,574 B1* | 7/2015 | Healey | H04L 25/03057 |
| 2015/0117511 A1* | 4/2015 | Lyubomirsky | H04L 25/03885 375/233 |

* cited by examiner

*Primary Examiner* — Sung S Ahn
(74) *Attorney, Agent, or Firm* — Lowenstein Sandler LLP

(57) ABSTRACT

A receiver includes an analog-to-digital converter (ADC) to generate a digital output, including a set of bits corresponding to a received signal. The receiver further includes a calculator circuit coupled to the ADC, the calculator circuit to calculate a set of tap coefficient gradient values corresponding to the digital output, generate a first feedback signal corresponding to the set of tap coefficient gradient values, and generate a second feedback signal corresponding to the set of tap coefficient gradient values. The receiver further includes a clock data recovery (CDR) circuit, coupled to the calculator circuit, the CDR circuit to detect a first parameter of the received signal based on the first feedback signal. The receiver further includes a feed forward equalization (FFE) system, coupled to the calculator circuit, the FFE system including multiple filter taps having a set of filter tap coefficients to be adapted based on the second feedback signal to generate a set of adapted filter tap coefficients.

20 Claims, 6 Drawing Sheets

CLOCK AND DATA RECOVERY CIRCUIT AND FEED FORWARD EQUALIZER DECOUPLING

TECHNICAL FIELD

At least one embodiment pertains to processing resources used to perform high-speed communications. For example, at least one embodiment pertains to technology for managing constraints of an adaptation algorithm implemented by an equalization component and a clock and data recovery component to decouple equalization and clock data recovery functions.

BACKGROUND

Communications systems transmit and receive signals at a high data rate (e.g., up to 200 Gbits/sec). Serial links involve high-speed data communication between serializer-deserializer (SerDes)-based devices, which employ data equalization to enable increasingly higher data rates. A current serial link uses a SerDes on each end of the link, each with its own Transmitter (TX) and Receiver (RX). The medium or channel used to carry a transmitted signal between a TX and an RX can vary over time (e.g., by temperature), which can result in a change in the channel's impulse response. Furthermore, the transmit-side and receive-side can have frequency misalignment associated with their respective clocks. This misalignment can lead to a different sampling point over time.

The SerDes can include circuits configured to track the aforementioned misalignment and other signal variations. One example tracking circuit of the SerDes is a clock and data recovery circuit (CDR), which tracks variations such as TX-RX frequency offset and phase jitter. The SerDes can also include an equalization component, such as a Feed-Forward Equalizer (FFE), to provide optimized adaptation of the signal to track after-channel and insertion loss (IL) variation. Certain FFEs implement an adaptation scheme which can be based on a least-mean-square (LMS) algorithm, or another lower cost option such as a sign-sign LMS (SS-LMS) implementation.

The input data fed to the CDR can be from a point within the communication path before the equalization component. However, a larger amount of data noise is realized when the CDR input data originates from a point before the FFE (e.g., the CDR input is from an analog-to-digital converter (ADC)). In other systems, the CDR input data originates from a point in the communication path after the FFE. Such systems exhibit less data noise since the input signal to the CDR is equalized by the FFE, but results in a coupling between the CDR and the FFE. This undesirable coupling causes different sampling points to cause a different measured impulse response.

In some systems, the CDR block detects the phase error by its phase-detector (PD) block, which is implemented using an algorithm such as a Mueller-Muller algorithm, an Early-Late algorithm, a minimum mean square error (MMSE) detection algorithm, etc. To improve the quality of the phase detector (e.g., the signal-to-noise ratio), the phase detector can be located after the FFE, at a stage where the signal's quality has been improved by the FFE adaptation. However, since the FFE (e.g., an LMS-based FFE) and the phase detector receive respective input signals from a same point, the result is undesirable LMS-CDR coupling.

In addition, to reduce the complexity of the FFE and enable nonlinearity compensation, some architectures include a constant FFE main tap and tunable post-FFE slicer levels. However, these architectures increase the negative coupling effects associated with CDR and FFE slicer adaptation.

Certain SerDes architectures include the use of zero-forcing (ZF) phase detectors located after the FFE and the constant main tap of the FFE with tunable slicing levels. To mitigate the coupling effects, these SerDes components include a linear time-invariant (LTI) constraints in the FFE of a constant first post-cursor tap to approximate a constant group-delay. However, the use of the LTI constraints is ineffective in certain cases, such as high-oscillate low-IL channels and systems where the CDR-FFE converge together to a sub-optimal steady state point.

Accordingly, there is a need for a robust post-FFE decoupling of the LMS-based FFE and the CDR circuits of a SerDes component of a receiver or transmitter of a communication system.

BRIEF DESCRIPTION OF DRAWINGS

Various embodiments in accordance with the present disclosure will be described with reference to the drawings, in which.

DETAILED DESCRIPTION

Figure 1A:
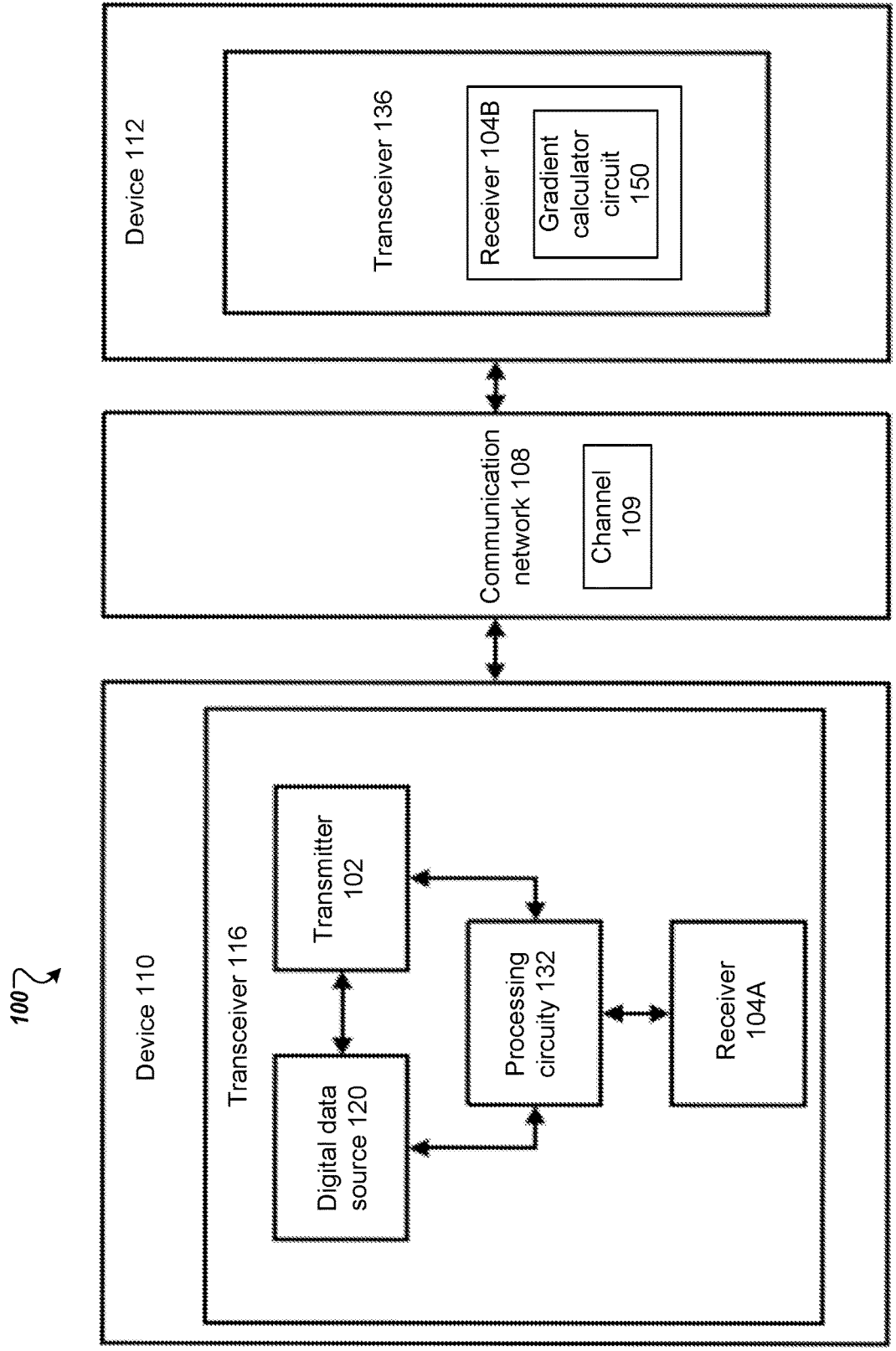
FIG. 1A illustrates an example communication system, in accordance with at least some embodiments.

As described above, management of a clock and data recovery circuit (CDR) and a feed-forward equalizer circuit (FFE) implementing a least-mean-square (LMS) algorithm by a receiver in a communication system may be needed. For example, typical approaches employ complex linear-time variant constraints (e.g., a constant T/4 FFE frequency response), where the constraints establish the combinations or "directions" in which the LMS is blocked or prevented from moving to prevent the coupling of the CDR and LMS. Advantageously, the CDR and LMS-based FFE are decoupled, such that the CDR and FFE are prohibited from compensating for each other and converging to a sub-optimal solution caused by the processing of multiple local media). However, the use of complex LTI constraints fails to provide for decoupling in many instances, such as in high-oscillate low-IL channels, where the CDR-LMS couple and converge or drift together to a sub-optimal, steady-state point.

Advantageously, aspects of the present disclosure are directed to a calculator circuit (herein referred to as a "gradient calculator circuit") configured for implementation in a digital signal receiver. In an embodiment, the gradient calculator circuit calculates a set of tap coefficient gradient values corresponding to a digital output of an analog-to-digital converter (ADC) (also referred to as continuous-value signal $Z_{adc}$), where the digital output includes a set of bits corresponding to a received signal. Using the calculated tap coefficient gradient values, the gradient calculator circuit extracts a first combination or "first direction" that is to be provided to a clock and data recovery circuit (CDR) having a phase detector (PD).

In an embodiment, the gradient calculator circuit generates a first feedback signal corresponding to the subset of extracted tap coefficient gradient values and provides the first feedback signal to the CDR. In an embodiment, the first feedback signal is a cost function associated with a first gradient value. The cost function represents a value associated with the signal that is being optimized (e.g., minimized or maximized). For example, the cost function can represent a mean-squared error (MSE) value of a difference between the received signal and a desired or target signal. In an embodiment, the PD of the CDR receives and uses the first feedback signal, received from the gradient calculator circuit, to identify a first parameter of the received signal (e.g., a phase error).

In an embodiment, the gradient calculator circuit generates a second feedback signal corresponding to the set of tap coefficient gradient values fed or provided to the FFE system. The FFE system includes a set of filter taps that adapts a first set of filter tap coefficients based on the second feedback signal to generate a set of adapted filter tap coefficients.

In an embodiment, the first feedback signal generated by the gradient calculator circuit includes a first set of vectors corresponding to the set of tap gradient values. In an embodiment, the second feedback signal generated by the gradient calculator circuit includes a second set of vectors corresponding to the set of tap gradient values. In an embodiment, the LMS's constraints are used as the input value of the PD of the CDR, such that the LMS is not permitted or allowed to move over this direction (i.e., the first set of vectors of the first feedback signal fed to the CDR are orthogonal to the second set of vectors of the second feedback signal fed to the FFE (i.e., the LMS adaptation implemented by the FFE).

According to embodiments, the gradient calculator circuit further generates a third set of vectors corresponding to the set of tap coefficient gradient values. The third set of vectors is provided to a set of data detector circuits (e.g., slicers) configured to identify and extract samples of the received signal. In embodiments, the data detector adaptation is segmented or split into two parts: a common gain adaptation (e.g., linear distribution of gradient values) and a differential adaptation (e.g., a non-linear distribution of gradient values). According to embodiments, one or more data detector circuits associated with the feedback circuits (e.g., the CDR and LMS-based FFE) are adapted according to the common gain adaptation. In embodiments, one or more data detector circuits associated with feed forward circuits (e.g., a decision feedback equalizer (DFE), a maximum likelihood sequence estimator (MLSE) equalizer, a differential feed forward equalizer (DFFE), etc.) are adapted according to the differential gain adaptation. In an embodiment, the common gain is tuned by the LMS's main tap gradients, so the data detector adaptation is advantageously decoupled from the CDR and FFE.

FIG. 1A illustrates an example communication system 100 according to at least one example embodiment. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices also connected to a common type of communication network 108. According to embodiments, the receiver 104A, 104B of devices 110 or 112 may correspond to a graphics processing unit (GPU), a switch (e.g., a high-speed network switch), a network adapter, a central processing unit (CPU), etc. As another specific but non-limiting example, the devices 110 and 112 may correspond to servers offering information resources, services and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104A, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104B of device 112. In an embodiment, the receiver 104B includes a gradient calculator circuit 150. Additional details of the structure of the receiver 104B and gradient calculator circuit 150 are discussed in more detail below with reference to the figures.

The receiver 104A, 104B of device 110 and device 112 may include suitable hardware and/or software for receiving signals, for example, data signals from the communication network 108. For example, the receivers 104A, 104B may include components for receiving processing signals to extract the data for storing in a memory.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

Figure 1B:
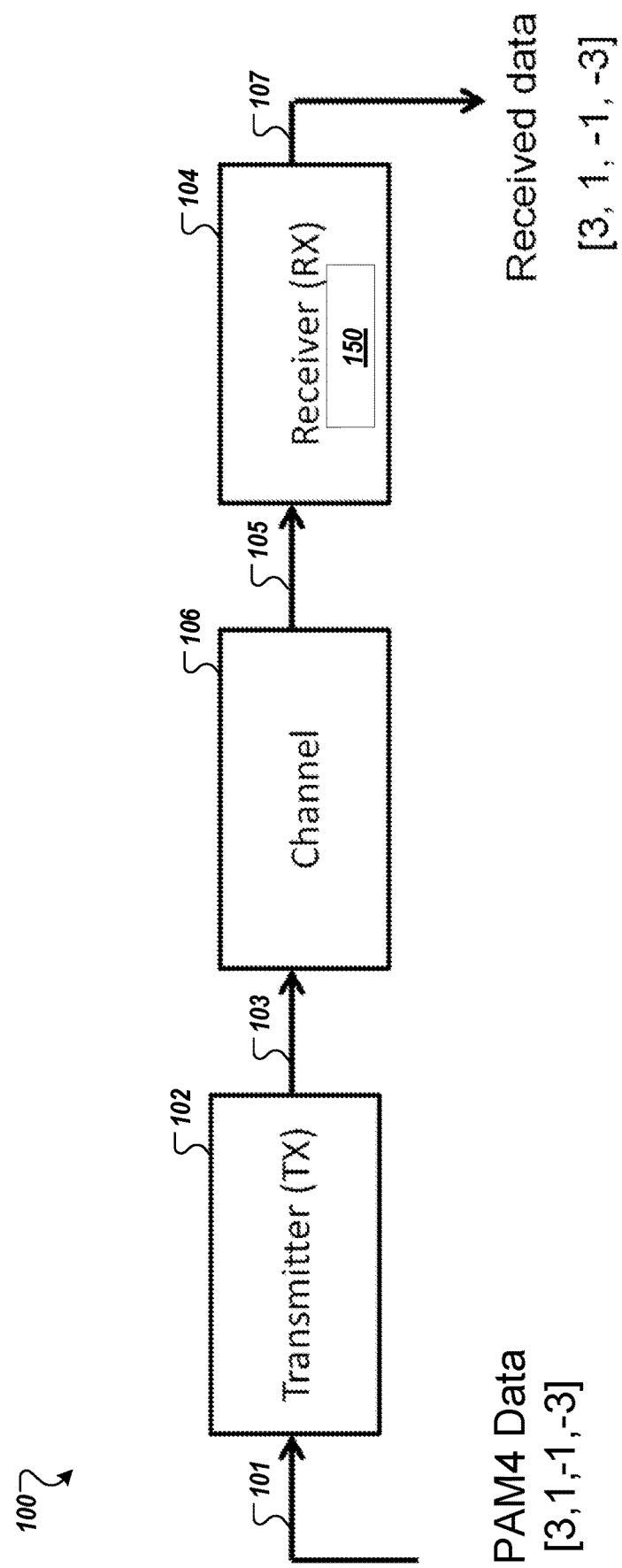
FIG. 1B illustrates a block diagram of an exemplary communication system employing an example modulation scheme, in accordance with at least some embodiments.

FIG. 1B illustrates a block diagram of an exemplary communication system 100 employing an example PAM modulation scheme. In the example shown in FIG. 1, a PAM level-4 (PAM4) modulation scheme is employed with respect to the transmission of a signal (e.g., digitally encoded data) from a transmitter (TX) 102 to a receiver (RX) 104 via a communication channel 106 (e.g., a transmission medium). In this example, the transmitter 102 receives 101 an input data (i.e., the input data at time n is represented as "a(n)"), which is modulated in accordance with a modulation scheme (e.g., PAM4) and sends 103 the signal a(n) including a set of data symbols (e.g., symbols −3, −1, 1, 3, wherein the symbols represent coded binary data). It is noted that while the use of the PAM4 modulation scheme is described herein by way of example, other data modulation schemes can be used in accordance with embodiments of the present disclosure, including for example, a PAM2 modulation scheme, PAM8, PAM16, etc. For example, for a PAM2-based system, the transmitted data symbols consist of symbols −1 and 1, with each symbol value representing a binary bit. Typically a binary bit 0 is encoded as −1, and a bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11 or 00, 01, 11, 10 while using Gray coding).

The communication channel 106 is a destructive medium in that the channel acts as a low pass filter which attenuates higher frequencies more than it attenuates lower frequencies and introduces inter-symbol interference (ISI). The communication channel 106 can be over serial links (e.g., a cable, printed circuit boards (PCBs) traces, copper cables, optical fibers, or the like), read channels for data storage (e.g., hard disk, flash solid-state drives (SSDs), high-speed serial links, deep space satellite communication channels, applications, or the like).

The receiver (RX) 104 includes a gradient calculator circuit 150, which is a circuit configured to generate sets of vectors associated with tap coefficient gradients values to decouple the functional operation of tracking circuits of the receiver 104B (e.g., a CDR, LMS-based FFE, and set of data detectors of the receiver 104). According to embodiments, the gradient calculator circuit 150 applies constraints corresponding to combinations or "directions" to establish a relative movement of the CDR and LMS that operate as a phase-detector. According to embodiments, the LMS constraints are used as the input value for the phase detector of the CDR, where the LMS is controlled such that it does not move over the corresponding direction (e.g., the vectors of the CDR and the LMS are in an orthogonal relationship), which results in the decoupling of the CDR and LMS.

Figure 2:
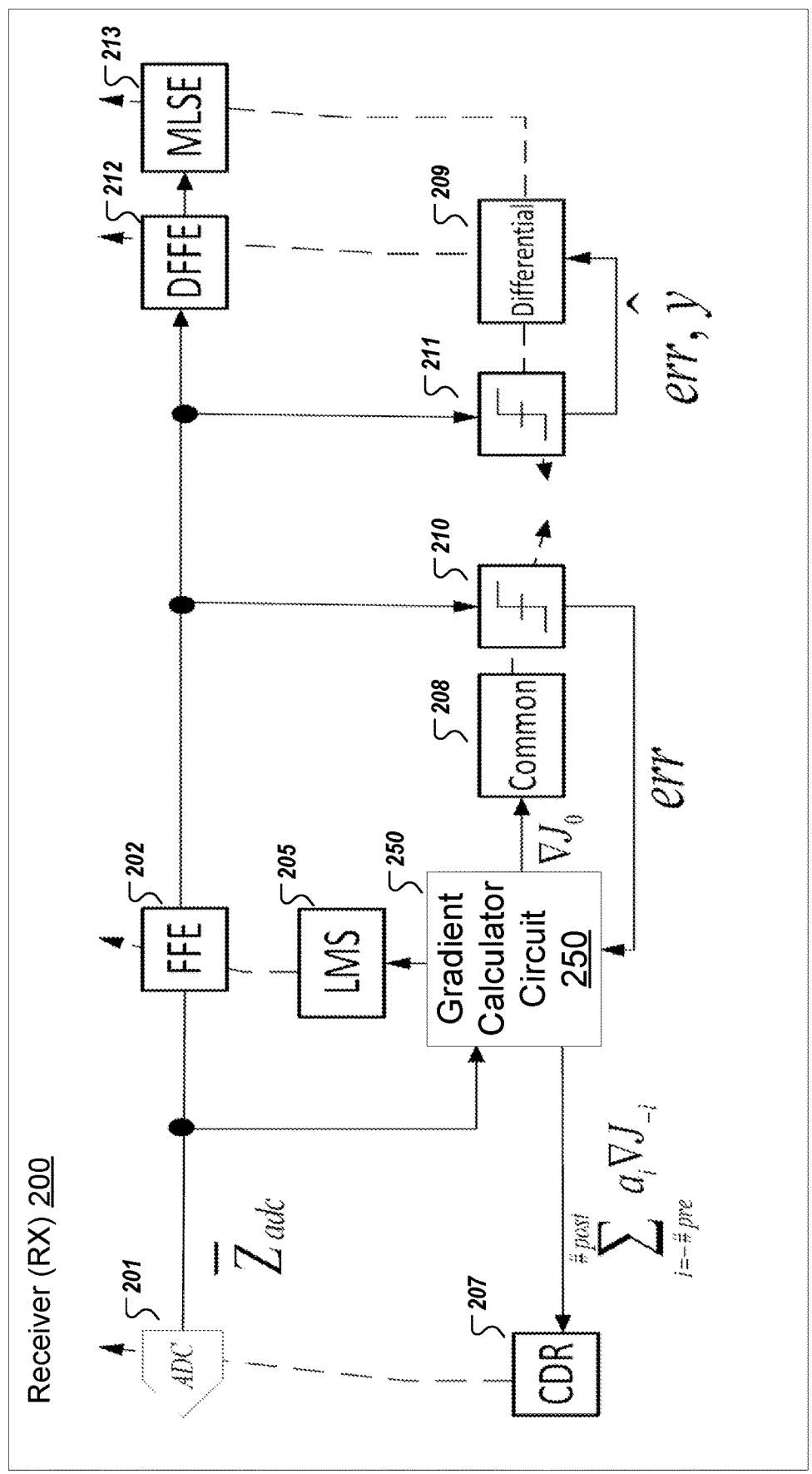
FIG. 2 illustrates an example receiver device including a gradient calculator circuit to generate a first feedback signal and a second feedback signal to decouple a clock and data recovery circuit and a feed forward equalization system, in accordance with at least some embodiments.

FIG. 2 illustrates an example receiver 200 including an analog-to-digital converter circuit (ADC) 201. The ADC 201 receives the signal (e.g., via a channel from a transmitter) and converts the analog input signal to a digital signal (e.g., continuous-value signal ($\overline{Z}_{adc}$)). The output of the ADC 201 ($\overline{Z}_{adc}$) is sent to an equalization component 202 (e.g., a feed-forward equalizer (FFE) and a gradient calculator circuit 250. According to embodiments, the gradient calculator circuit 250 is configured to implement the CDR-LMS-slicer adaptation decoupling scheme, as described in greater detail herein.

The FFE 202 is a digital equalizer used to mitigate the effects of intersymbol interference (ISI) by sampling the output of the ADC 201 at selected time instances to properly detect the received data such that the recovered data is error-free. In an embodiment, the FFE includes a set of filter taps having a set of filter coefficients to be adapted to track and mitigate channel variation and insertion loss variation in the signal. According to embodiments, the adaptation implemented by the FFE 202 is based on a least-mean-square (LMS) scheme, represented in FIG. 2 as LMS 205.

As shown in FIG. 2, the gradient calculator circuit 250 receives an error value (e.g., a distance between the continuous-value signal ($\overline{Z}_{adc}$) and an estimated discrete-value signal ($\hat{y}$)) determined by a data detector (e.g., slicer) 211. The error value (err) and continuous-value signal from the ADC ($\overline{Z}_{adc}$) are provided to the gradient calculator circuit 250 for us in calculating tap coefficient gradient values corresponding to the output of the ADC, as illustrated in FIG. 3.

Figure 3:
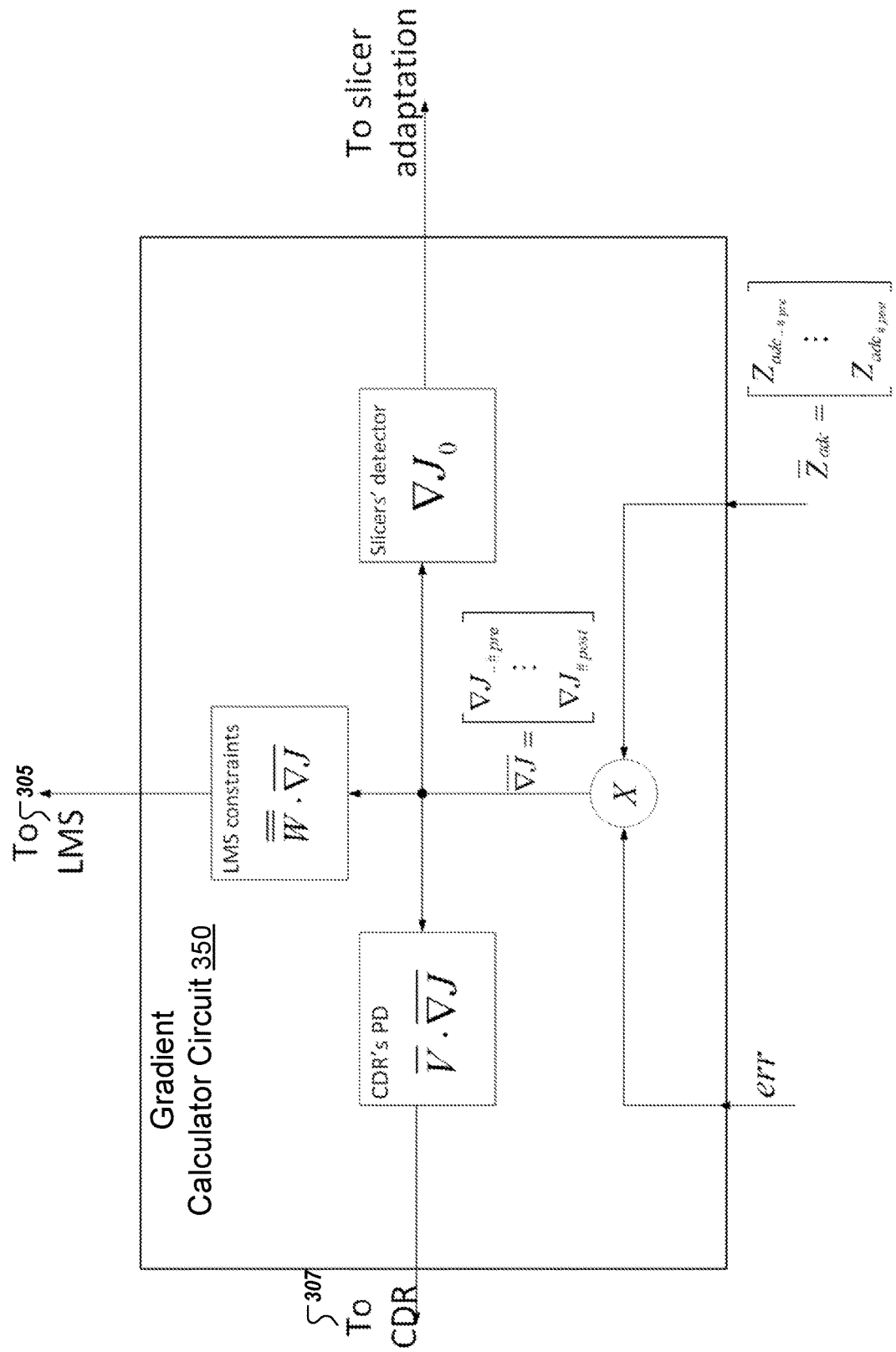
FIG. 3 illustrates an example gradient calculator circuit to generate a first feedback signal and a second feedback signal to decouple a clock and data recovery circuit and a feed forward equalization system, in accordance with at least some embodiments.

As shown in FIG. 3, the gradient calculator circuit 350 determines a cost function (J) associated with a value to be optimized (e.g., a value to be minimized or maximized). For example, the value associated with cost function (J) can be a mean-squared-error (MMSE) value of a difference between the received signal and the target or desired signal. An example MMSE cost function is represented by the following expression:

$$\min J = \min_{\overline{F}} E\left[\left(y_{ffe} - \overline{F}^T \overline{Z}_{adc}\right)^2\right] = \min_{\overline{r}} E\left[\left(y_{ffe} - \left(\overline{F}(0) + \overline{r}\right)^T \overline{Z}_{adc}\right)^2\right]$$

where J represents the cost function; where E represents an expectation operator (e.g., an averaging operator); where F represents a vector of the FFE weights (i.e., tap coefficients), where $(\ )^T$ represents a matrix/vector transposition function (e.g., rows/columns replacement); where F(0) is the FFE start value; where F is a current value of the FFE which is based on the initial or start value and any changes in the FFE value; where r represents the changes in the F value; and $y_{ffe}$ represents a real discrete-value signal of the FFE (e.g., the continuous-value signal after the data detector (slicer) makes a decision and identifies a signal value (e.g., a PAM4 value)).

In an embodiment, linear time-invariant (LTI) constraints (V) can be added to the cost function, as represented by the following expression:

$$\min_F J \big|_{\bar{V}^T (F_{opt} - F(0)) = \bar{0}};$$

where $\nabla^T$ is a constraints matrix; and where Fopt represents an optimized FFE coefficient.

According to embodiments, adding the LTI constraints to the cost function does not change a solution associated with a Wiener Filter (i.e., a filter used to r is to compute a statistical estimate of an unknown signal using a related signal as an input and filtering that known signal to produce the estimate as an output).

According to embodiments, the gradient calculator circuit 350 estimates all gradients vectors together (i.e., a set of gradient vectors) and splits the estimated gradient vectors into two sub-planes or sub-sets of vectors (i.e., a first set of vectors and a second set of vectors). According to an embodiment, the first set of vectors and the second set of vectors are orthogonal to one another.

According to embodiments, the gradient calculator circuit 350 generates a first feedback signal corresponding to the set of tap coefficient gradient values that is to be fed back as an input to the phase detector (PD) of the CDR 307. The first feedback signal is based on the first set of vectors generated by the gradient calculator circuit 350.

According to embodiments, the first feedback signal (referred to as the "CDR's PD" or "$\nabla\ \nabla J$") is determined based on an LMS constraint represented by an LMS constraints matrix ($\nabla$). A type of algorithm (i.e., algorithm type) can be selected by the gradient calculator circuit 350 and executed to generate the set of LMS constraints (e.g., the LMS constraints matrix). In an embodiment, the LMS constraints matrix that is used to generate the first feedback signal that is provided to the PD of the CDR (i.e., the CDR's PD) is selectable by the gradient calculator circuit 350 from a set of algorithm types. In an embodiment, the LMS constraints ($\nabla$) used to determine the CDR's PD can be determined using one of the following algorithm types: a central derivative algorithm, a mean derivative algorithm, or a Mueller-Muller algorithm, to achieve decoupling of the CDR and the LMS.

In an example, the CDR's PD can be determined using a central-derivatives phase detector to establish the LMS constraints matrix ($\nabla$), as illustrated by the following expressions:

$$\bar{V} = \begin{bmatrix} 0, 0, 0, 1, 0, 0, 0, 0 \\ 0, 0, 1, 0, -1, 0, 0, 0 \end{bmatrix}$$

$$\bar{V} = \begin{bmatrix} 0, 0, 0, 1, 0, 0, 0, 0 \\ 0, 0, 1, 0, -1, 0, 0, 0 \end{bmatrix}$$

$$I - \bar{V}\left(\bar{V}^T \bar{V}\right)^{-1} \bar{V}^T =$$

$$\begin{bmatrix} 1.0000 & 0 & 0 & 0 & 0 & 0 & 0 & 0 \\ 0 & 1.0000 & 0 & 0 & 0 & 0 & 0 & 0 \\ 0 & 0 & 0.5000 & 0 & 0.5000 & 0 & 0 & 0 \\ 0 & 0 & 0 & 0 & 0 & 0 & 0 & 0 \\ 0 & 0 & 0.5000 & 0 & 0.5000 & 0 & 0 & 0 \\ 0 & 0 & 0 & 0 & 0 & 1.0000 & 0 & 0 \\ 0 & 0 & 0 & 0 & 0 & 0 & 1.0000 & 0 \\ 0 & 0 & 0 & 0 & 0 & 0 & 0 & 1.0000 \end{bmatrix} \cdot \begin{bmatrix} \nabla J_{-3} \\ \nabla J_{-2} \\ \nabla J_{-1} \\ \nabla J_0 \\ \nabla J_1 \\ \nabla J_2 \\ \nabla J_3 \\ \nabla J_4 \end{bmatrix}$$

$$CDR's\ PD = \overline{V\nabla J} = err(n) \cdot (z_{adc}(n+1) - z_{adc}(n-1))$$

where $\nabla$ is a matrix representing a set of LMS constraints (e.g., the constraints that the LMS is to implement); where I is an identity matrix (e.g., a matrix of M×M of "0" with "1" on the main slant); where $\equiv J$ is the gradient of the cost function (e.g., a multiplication of the data detector (slicer) error and the input signal of the FFE; where err(n) is the error on a data detector (slicer error) on a discrete time index, where n corresponds to a sample at time n, n+1 corresponds to a next sample after n, and n−1 corresponds to a sample prior to n). According to embodiments, the LMS constraints matrix ($\nabla$) includes a set of vectors (i.e., a first set of vectors) that is orthogonal to a set of vectors of the LMS weights matrix (W) (i.e., a second set of vectors).

In an example, the CDR's PD can be determined using a mean-derivatives phase detector to establish the LMS constraints ($\nabla$), as illustrated by the following expressions:

$$\bar{V} = \begin{bmatrix} 0, 0, 0, 1, 0, 0, 0, 0 \\ 0, 1, -1, -2, 1, 1, 0, 0 \end{bmatrix}$$

$$I - \bar{V}\left(\bar{V}^T \bar{V}\right)^{-1} \bar{V}^T =$$

$$\begin{bmatrix} 1.0000 & 0 & 0 & 0 & 0 & 0 & 0 & 0 \\ 0 & 0.7500 & 0.2500 & 0 & -0.2500 & -0.2500 & 0 & 0 \\ 0 & 0.2500 & 0.7500 & 0 & -0.2500 & 0.2500 & 0 & 0 \\ 0 & 0 & 0 & 0 & 0 & 0 & 0 & 0 \\ 0 & -0.2500 & 0.2500 & 0 & 0.7500 & -0.2500 & 0 & 0 \\ 0 & -0.2500 & 0.2500 & 0 & -0.2500 & 0.7500 & 0 & 0 \\ 0 & 0 & 0 & 0 & 0 & 0 & 1.0000 & 0 \\ 0 & 0 & 0 & 0 & 0 & 0 & 0 & 1.0000 \end{bmatrix} \cdot \begin{bmatrix} \nabla J_{-3} \\ \nabla J_{-2} \\ \nabla J_{-1} \\ \nabla J_0 \\ \nabla J_1 \\ \nabla J_2 \\ \nabla J_3 \\ \nabla J_4 \end{bmatrix}$$

$$CDR\text{'s } PD = e(n) \cdot (z_{adc}(n+2) - z_{adc}(n+1) - 2 \cdot z_{adc}(n) + z_{adc}(n-1) + z_{adc}(n-2))$$

As shown in FIG. 3, the gradient calculator circuit 350 generates a second feedback signal corresponding to the set of tap coefficient gradient values and provides the second feedback signal to the LMS circuit (e.g., LMS 205 of FIG. 2) associated with the FFE system (e.g., FFE 202 of FIG. 2). According to embodiments, the second feedback signal includes a second set of vectors corresponding to the set of tap coefficient gradient values calculated by the gradient calculator circuit 350. According to an embodiment, the second set of vectors (provided to the LMS) is orthogonal to the first set of vectors (provided to the PD of the CDR).

According to embodiments, the second feedback signal includes the LMS constraints, represented by the following expression:

$$\overline{W} \cdot \overline{\nabla J}$$

where $\overline{W}$ is a matrix of LMS weights (e.g., a deterministic weights matrix that forces the LMS to implement the target or desired constraints of the matrix V). In an embodiment, the LMS weights matrix can be represented by the following expression:

$$\overline{W} = I - \overline{V}(\overline{V}^T \overline{V})^{-1} \overline{V}^T$$

According to embodiments, the LMS weights matrix (W) is the orthogonal matrix to the LMS constraints matrix (V). In an embodiment, the phase detector combination is determined by the LMS constraints matrix (V); and the LMS constraints matrix (W) is generated based on this LMS constraints matrix (V).

In an embodiment, the gradient calculator circuit 350 can generate a third set of vectors used for adaptation of the set of data detectors (e.g., slicers 210, 211 of FIG. 2). As shown in FIG. 3, $\nabla J(0)$ represents the gradients at the data detector's main tap which corresponds to a location of "1" in the $\nabla$ matrix above, where the FFE's group delay is centered around the main tap, such that the delay has a maximal correlation with the transmitted data.

The gradient calculator circuit 350 can perform the data detector adaptation in two parts: a common gain adaptation and a differential gain adaptation (e.g., a non-linear distribution of gradient values). With reference to FIG. 2, in an embodiment, the one or data detectors (e.g., data detector 210) associated with the feedback circuits (e.g., the CDR 207 and the LMS 205) are used with the common gain function 208 and the one or more data detectors (e.g., data detector 211) associated with the feed forward circuits (e.g., the DFFE 212 and MLSE 213) are used with the differential gain function 209.

In an embodiment, the common gain function 208 is tuned by the LMS's main tap gradients to enable the decoupling of the data detector adaptation. For example, the common gain function can be turned by the gradient associated with the main tap of the FFE 202, as represented by the following expression:

$$ETH_i(n+1) = ETH_i(n) + i \cdot \mu \cdot \text{sign}(\nabla J_{main}(n)), \ i \in \{0, \pm 2, \pm 4, \pm 6\};$$

where $ETH_i$ is a data level associated with the data detector (e.g., the discrete-value of the data detector) corresponding to element index i, where i is an element number in the vector, where $\mu$ is an iteration step size, and $\nabla J_{main}$ is the gradient of the cost function associated with the main tap of the FFE. In an embodiment, the corresponding set of vectors (e.g., the third set of vectors) is orthogonal to the LMS's constant main tap constraint. In an embodiment, since the constant main tap constraint is included in V matrix (e.g., the row of zeros with a single "1"), the W matrix, which defines the LMS's directions, is orthogonal to this constraint.

In an embodiment, the gradient calculator circuit 350 adapts the data detectors associated with the feed forward components separately from the common gain portion. In an embodiment, the differential data detector adaptation includes the removal of the common gain to achieve decoupling of the LMS and the differential data detectors. In an embodiment, the LMS and the one or more differential data detectors 211 (e.g., the data detectors associated with the feed forward path) include the correction of the differential portion on the next blocks (e.g., the DFFE 212 and MLSE 213) and close the LMS during adaptation of the one or more data detectors 211.

Figure 4:
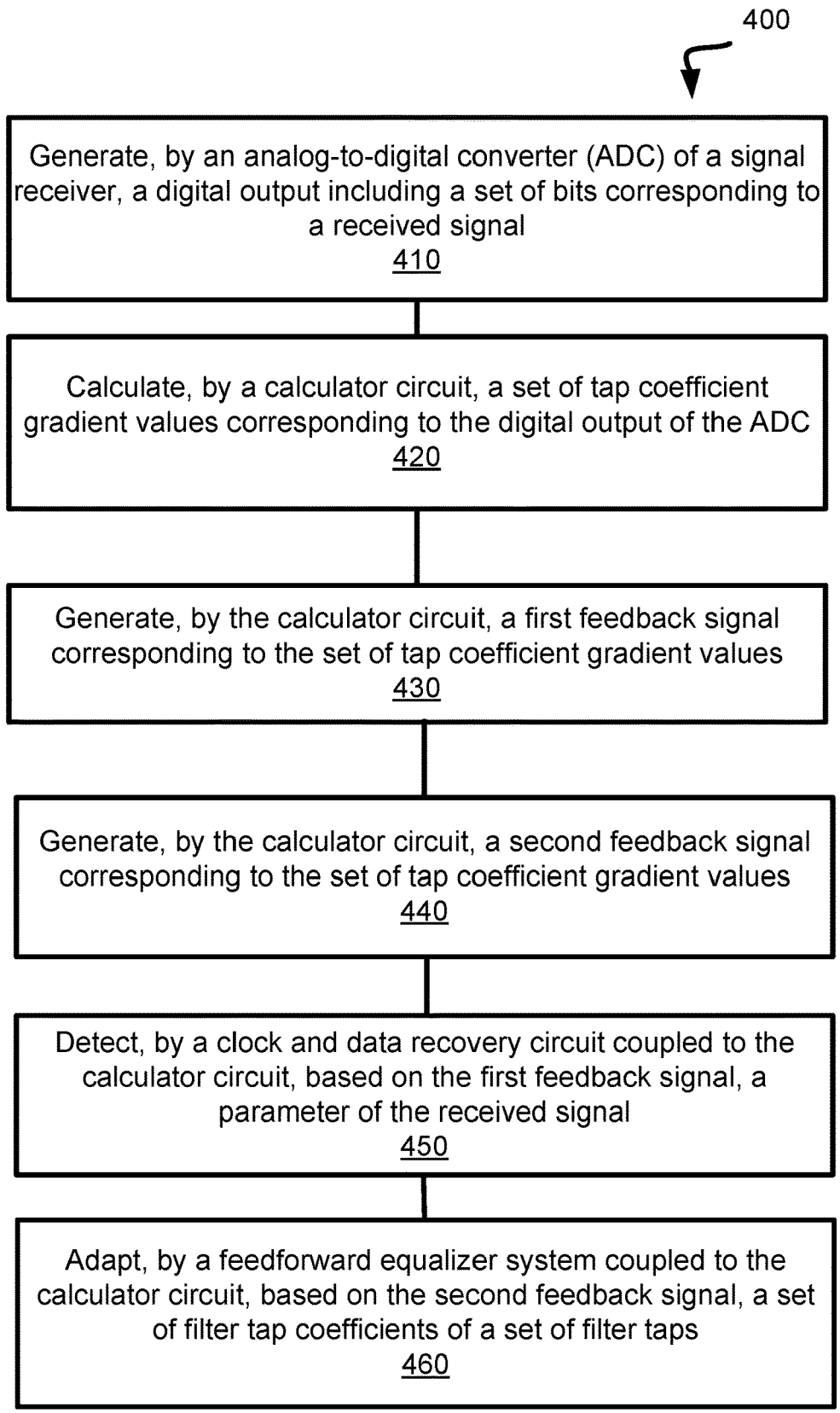
FIG. 4 illustrates a flow diagram of a method to generate a first feedback signal and a second feedback signal to decouple a clock and data recovery circuit and a feed forward equalization system, in accordance with at least some embodiments.

FIG. 4 is a flow diagram of a method 400 of decoupling a CDR circuit and an LMS-based FFE in processing a signal received by a receiver in a communication system. The method 400 can be performed by processing logic comprising hardware, software, firmware, or any combination thereof. In at least one embodiment, the method 400 is performed by the gradient calculator circuit 150 of FIGS. 1A and 1B, the gradient calculator circuit 250 of FIG. 2, or the gradient calculator circuit 350 of FIG. 3. In at least one embodiment, the method 400 is performed by various components of the gradient calculator circuit 150, 250, and 350 to provide the CDR circuit with a first feedback signal and provide the LMS of the FFE with a second feedback signal for the subsequent tracking of parameters associated with the received signal. According to embodiments, the method 400 can be performed by a receiver (e.g., a receiver device in a communications system) having a gradient calculator circuit, in accordance with the embodiments described herein with reference to a receiver-side gradient calculator circuit. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, an analog-to-digital converter (ADC) of a signal receiver generates a digital output including a set of bits corresponding to a received signal. In an embodiment, the signal can be transmitted in accordance with a suitable modulation scheme (e.g., PAM, QAM, etc.).

At operation 420, a calculator circuit (e.g., the gradient calculator circuit 150, 250, 350) calculates a set of tap coefficient gradient values corresponding to the digital output of the ADC.

At operation 430, the calculator circuit generates a first feedback signal corresponding to the set of tap coefficient gradient values. In an embodiment, the first feedback signal includes a first set of vectors corresponding to the set of tap coefficient gradient values. In an embodiment, constraints of an LMS circuit (e.g., LMS 205, 305 of FIG. 2 and FIG. 3, respectively) associated with a feed forward equalization system (e.g., FFE 202 of FIG. 2) are used as a phase detector (PD) of the CDR circuit. In an embodiment, the LMS constraints are configurable such that the constraints can be calculated in accordance with an algorithm (e.g., a central-derivative algorithm, a mean-derivative algorithm, etc.) that can be selected by the calculator circuit.

At operation 440, the calculator circuit generates a second feedback signal corresponding to the set of tap coefficient gradient values. In an embodiment, the second feedback signal includes a second set of vectors corresponding to the set of tap coefficient gradient values, where the second set of vectors is orthogonal to the first set of vectors.

At operation 450, the CDR circuit of the receiver is provided with the first feedback signal from the calculator circuit and uses the first feedback signal to detect a first parameter (e.g., clock or timing information associated with the received signal, a TX-RX frequency offset, after phase jitter, etc.) of the received signal.

At operation 460, the FFE system is provided with the second feedback signal from the calculator circuit and uses the second feedback signal to adapt a set of filter tap coefficients of a set of filter taps of the FFE system. In an embodiment, the FFE system uses the second set of vectors of the second feedback signal, which are orthogonal to the first set of vectors of the first feedback signal sent to the CDR circuit, to generate a set of adapted filter tap coefficients.

Figure 5:
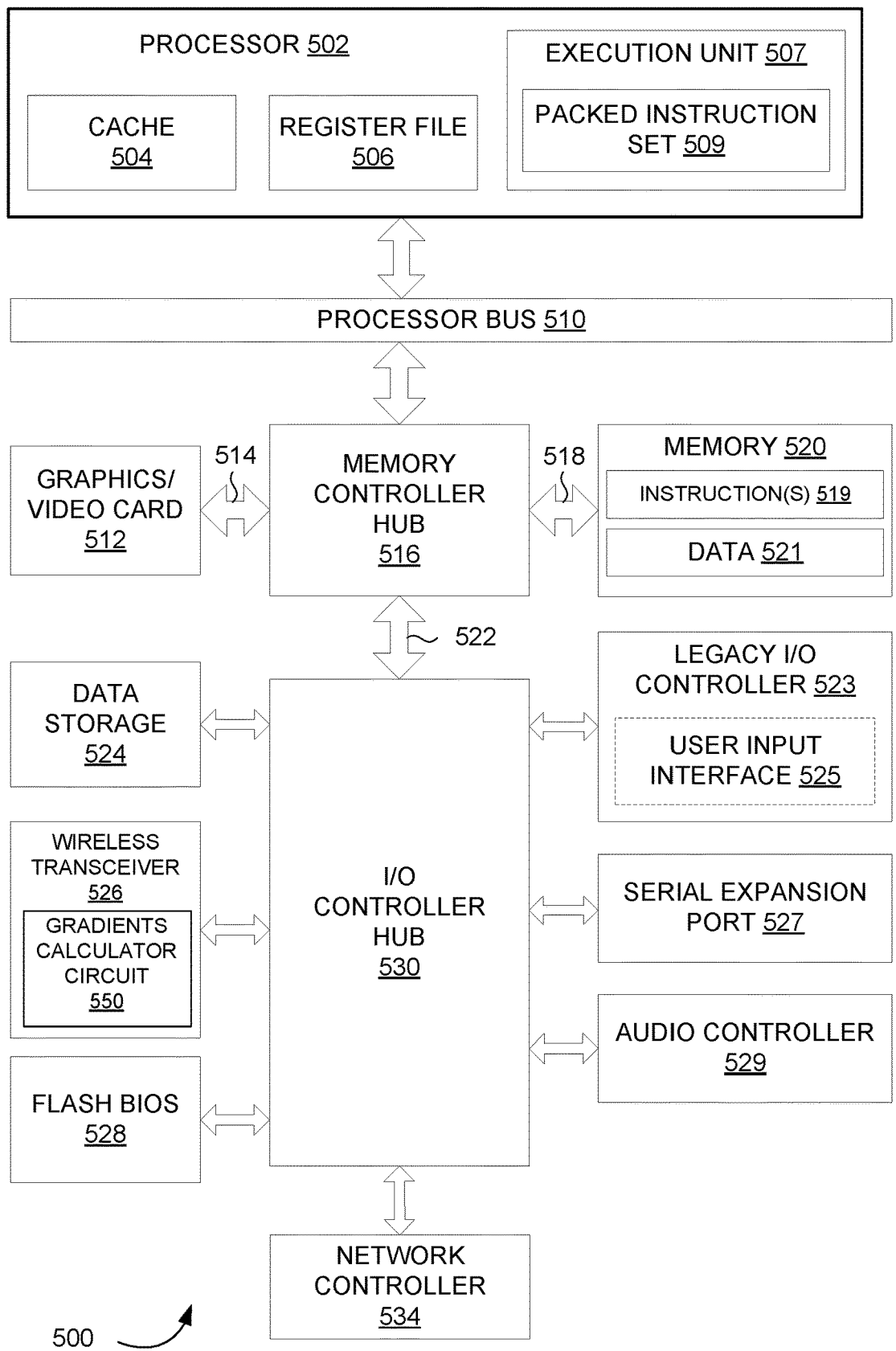
FIG. 5 illustrates an example computer system including a wireless transceiver including a gradient calculator circuit, in accordance with at least some embodiments.

FIG. 5 illustrates a computer system 500, in accordance with at least one embodiment. In at least one embodiment, computer system 500 may be a system with interconnected devices and components, an SOC, or some combination. In at least one embodiment, computer system 500 is formed with a processor 502 that may include execution units to execute an instruction. In at least one embodiment, computer system 500 may include, without limitation, a component, such as processor 502, to employ execution units including logic to perform algorithms for processing data. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 500 may be used in other devices, such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 500 may be used in devices such as graphics processing units (GPUs), network adapters, central processing units and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 500 may include, without limitation, processor 502 that may include, without limitation, one or more execution units 507 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 500 is a single processor desktop or server system. In at least one embodiment, computer system 500 may be a multiprocessor system. In at least one embodiment, processor 502 may include, without limitation, a CISC microprocessor, a RISC microprocessor, a VLIW microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. In at least one embodiment, processor 502 may also include a combination of both internal and external caches. In at least one embodiment, a register file 506 may store different types of data in various registers including, without limitation, integer registers, floating point registers, status registers, and instruction pointer register.

In at least one embodiment, execution unit 507, including, without limitation, logic to perform integer and floating point operations, also resides in processor 502. Processor 502 may also include a microcode ("ucode") read-only memory ("ROM") that stores microcode for certain macro instructions. In at least one embodiment, execution unit 507 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 500 may include, without limitation, a memory 520. In at least one embodiment, memory 520 may be implemented as a DRAM device, an SRAM device, flash memory device, or other memory devices. Memory 520 may store instruction(s) 519 and/or data 521 represented by data signals that may be executed by processor 502.

In at least one embodiment, a system logic chip may be coupled to processor bus 510 and memory 520. In at least one embodiment, the system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, a system logic chip may provide a graphics port for coupling to a graphics controller. In at least one embodiment, MCH 516 may be coupled to memory 520 through high bandwidth memory path 518, and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, a local I/O bus may include, without limitation, a high-speed I/O bus for connecting peripherals to memory 520, a chipset, and processor 502. Examples may include, without limitation, an audio controller 529, a firmware hub ("flash BIOS") 528, a wireless transceiver 526, a data storage 524, a legacy I/O controller 523 containing a user input interface 525 and a keyboard interface, a serial expansion port 527, such as a USB, and a network controller 534. Data storage 524 may comprise a hard disk drive, a floppy disk drive, a CD-ROM device, a flash memory device, or other mass storage device. In an embodiment, the wireless transceiver 526 includes a gradient calculator circuit 550 (e.g., the gradient calculator circuit 150, 250, and 350 of FIGS. 1A, 1B, 2, and 3, respectively).

In at least one embodiment, FIG. 5 illustrates a system, which includes interconnected hardware devices or "chips." In at least one embodiment, FIG. 5 may illustrate an exemplary SoC. In at least one embodiment, devices illustrated in FIG. 5 may be interconnected with proprietary interconnects, standardized interconnects (e.g., PCIe), or some combination thereof. In at least one embodiment, one or more components of system 500 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A receiver comprising:
    an analog-to-digital converter (ADC) to generate a digital output comprising a set of bits corresponding to a received signal;
    a calculator circuit, coupled to the ADC, the calculator circuit to:
        calculate a set of tap coefficient gradient values corresponding to the digital output;
        generate a first feedback signal corresponding to the set of tap coefficient gradient values; and
        generate a second feedback signal corresponding to the set of tap coefficient gradient values;
    a clock data recovery (CDR) circuit, coupled to the calculator circuit, the CDR circuit to detect a parameter of the received signal based on the first feedback signal; and
    a feed forward equalization (FFE) system, coupled to the calculator circuit, the FFE system comprises a plurality of filter taps having a set of filter tap coefficients to be adapted based on the second feedback signal to generate a set of adapted filter tap coefficients.

2. The receiver of claim 1, wherein the first feedback signal comprises a first set of vectors corresponding to the set of tap coefficient gradient values; and wherein the second feedback signal comprises a second set of vectors corresponding to the set of tap coefficient gradient values.

3. The receiver of claim 2, wherein the first set of vectors is orthogonal to the second set of vectors.

4. The receiver of claim 2, wherein the calculator circuit generates a third set of vectors corresponding to the set of tap coefficient gradient values.

5. The receiver of claim 4, wherein the calculator circuit:
    generates a linear distribution of the set of tap coefficient gradient values based on the third set of vectors; and
    generates a non-linear distribution of the set of tap coefficient gradient values based on the third set of vectors.

6. The receiver of claim 5, wherein the linear distribution of the set of tap coefficient gradient values is provided to a first data detector associated with one or more of the CDR circuit and the FFE system.

7. The receiver of claim 5, wherein the non-linear distribution of the set of tap coefficient gradient values is provided to a second data detector associated with one or more feed forward circuits.

8. The receiver of claim 1, wherein the calculator circuit determines the second feedback signal based on a least-mean-square (LMS) adaptation algorithm.

9. The receiver of claim 8, wherein the LMS adaptation algorithm generates a set of LMS constraints.

10. The receiver of claim 9, wherein the first feedback signal comprises a first set of vectors are generated based on execution of an algorithm to generate the set of LMS constraints, wherein the algorithm is selected by the calculator circuit from a plurality of algorithm types.

11. The receiver of claim 10, wherein the plurality of algorithm types comprises a central derivative algorithm and a means derivative algorithm.

12. The receiver of claim 1, wherein the CDR circuit detects the parameter of the received signal based on the first feedback signal, wherein the parameter is a phase error of the received signal.

13. The receiver of claim 1, wherein the FFE system identifies an insertion loss associated with the received signal based on the second feedback signal.

14. A method comprising:
receiving a digital signal comprising a set of bits corresponding to a received signal;
calculating a set of tap coefficient gradient values corresponding to the digital signal;
generating a first feedback signal corresponding to the set of tap coefficient gradient values;
providing the first feedback signal to a clock data recovery (CDR) circuit, wherein the first feedback signal is used to detect a parameter of the received signal;
generating a second feedback signal corresponding to the set of tap coefficient gradient values; and
providing the second feedback signal to a feed forward equalization (FFE) system, wherein the second feedback signal is used to generate a set of adapted filter tap coefficients corresponding to a set of taps of the FFE system.

15. The method of claim 14, wherein the first feedback signal comprises a first set of vectors corresponding to the set of tap coefficient gradient values; and wherein the second feedback signal comprises a second set of vectors corresponding to the set of tap coefficient gradient values.

16. The method of claim 15, wherein the first set of vectors are orthogonal to the second set of vectors.

17. The method of claim 15, further comprising generating a third set of vectors corresponding to the set of tap coefficient gradient values.

18. The method of claim 17, further comprising:
generating a linear distribution of the set of tap coefficient gradient values based on the third set of vectors; and
generating a non-linear distribution of the set of tap coefficient gradient values based on the third set of vectors.

19. The method of claim 14, further comprising:
selecting a first algorithm type from a set of algorithm types; and
generating, based on the first algorithm type, a set of constraints associated with a least-mean-square (LMS) adaptation corresponding to the FFE system.

20. The method of claim 19, wherein the set of algorithm types comprises a central derivative algorithm and a means derivative algorithm.

* * * * *